US008429138B2

(12) United States Patent
Apostolopoulos et al.

(10) Patent No.: US 8,429,138 B2
(45) Date of Patent: Apr. 23, 2013

(54) METHOD AND APPARATUS FOR DATA EXCHANGE IN A DISTRIBUTED SYSTEM

(75) Inventors: George Apostolopoulos, Vancouver (CA); Christian Daudt, Vancouver (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 293 days.

(21) Appl. No.: 12/603,492

(22) Filed: Oct. 21, 2009

(65) Prior Publication Data

US 2011/0093483 A1 Apr. 21, 2011

(51) Int. Cl.
*G06F 7/00* (2006.01)
*G06F 17/00* (2006.01)
*G06F 15/16* (2006.01)

(52) U.S. Cl.
USPC ......................................... 707/693; 709/247

(58) Field of Classification Search .................. 707/625, 707/632, 641, 646, 800, 775, 64, 693; 709/247
See application file for complete search history.

(56) References Cited

U.S. PATENT DOCUMENTS

| | | | | |
|---|---|---|---|---|
| 5,379,419 A * | 1/1995 | Heffernan et al. | ..................... | 1/1 |
| 5,974,416 A | 10/1999 | Anand et al. | | |
| 6,032,197 A * | 2/2000 | Birdwell et al. | ............. | 709/247 |
| 6,151,602 A * | 11/2000 | Hejlsberg et al. | ....................... | 1/1 |
| 6,665,678 B2 * | 12/2003 | Ching Chen et al. | ......... | 707/704 |
| 7,152,180 B2 * | 12/2006 | Shoaib et al. | .................. | 714/4.4 |
| 7,512,715 B2 * | 3/2009 | Marks et al. | .................. | 709/247 |
| 7,734,042 B2 * | 6/2010 | Pare et al. | ........................ | 380/37 |
| 7,752,165 B2 * | 7/2010 | Ireland et al. | ................. | 707/609 |
| 2002/0035556 A1 | 3/2002 | Shah et al. | | |
| 2004/0246966 A1 * | 12/2004 | Wu et al. | .................... | 370/395.1 |

FOREIGN PATENT DOCUMENTS

| | | |
|---|---|---|
| EP | 2 048 855 A2 | 4/2009 |
| WO | WO 2009/071201 A1 | 6/2009 |

OTHER PUBLICATIONS

Hoffer et al. "Modern Database Management (7th Edition)" 2004. Prentice Hall. 7th Edition. pp. 295-301.*

* cited by examiner

*Primary Examiner* — James E Richardson
(74) *Attorney, Agent, or Firm* — Blakely Sokoloff Taylor & Zafman, LLP (57) ABSTRACT

An encoding module generates metadata descriptions for unique combinations of subset of fields of data structures that define for the receiver how to decode data in the corresponding subset of fields of that data structure included in messages; generates a unique metadata description identification for each different metadata description; includes metadata descriptions in the messages as well as the corresponding metadata description identifications when the receiver has not previously received those metadata descriptions. A decoding module stores metadata descriptions in a metadata description data structure as they are received, where each metadata description is associated with a metadata description identification, whereby the metadata description data structure is progressively populated with metadata for data structures as messages are received that include metadata descriptions; and decodes those messages received that do not include metadata descriptions based on the stored metadata descriptions that correspond with the metadata description identifications included in these messages.

23 Claims, 6 Drawing Sheets

METHOD AND APPARATUS FOR DATA EXCHANGE IN A DISTRIBUTED SYSTEM

BACKGROUND

1. Field

Embodiments of the invention relate to the field of data processing; and more specifically to exchange of data in a distributed system at a subset data structure granularity without per field overhead.

2. Background

Components in a distributed system commonly exchange data. Typically, the components exchange data in the form of data structures in their binary representation. Some data exchange mechanisms operate purely at a data structure granularity (i.e., the sending component sends each field of the data structure to the receiving component regardless whether each field actually has data), which can lead to waste if the sender does not populate each field of the data structure. For example, even though a sender may only populate a subset of fields of a data structure to send to a receiver, the entire data structure will be encoded, transmitted, and required to be fully decoded by the receiver. In distributed systems where state updates are exchanged frequently, the amount of unpopulated fields and waste can be large. One approach to deal with this waste is to design the data structures such that each subset of fields are themselves a separate data structure. However, since this will increase the number of data structures on the system and will require a new data structure to be defined for every new combination of fields to be sent, this increases the application complexity, has a high engineering cost, and is difficult to implement on existing systems.

Other data exchange mechanisms allow for the sender to declare fields of a data structure as optional and encode and transmit only those parts of the data structure. This allows for a sub-structure communication between components. However, these data exchange mechanisms require a per field overhead (e.g., 1 byte of overhead for each field sent, which typically takes the form of a field identifier) since the sender can send an arbitrary combination of the structure's fields and the receiver needs to be able to decode those fields.

As a prerequisite for both data exchange mechanisms described above, a high level description of the data structures to be exchanged, which defines how to handle the data to be sent or received, must be known to both the sender and the receiver. For example, for each data structure to be exchanged, this high level description includes the types of each field in the data structure, the length of each field in the data structure, the offset of the fields, etc. Data handling code is automatically generated based on this high level description and is used to encode the data to be sent at the sender and decode the data at the receiver. Since a typical distributed system exchanges data for many different data structures, these systems must manage a large number of data structure metadata and large amounts of automatically generated handling code.

SUMMARY

A sender in a distributed system with constrained resources encodes and transmits messages containing subsets of fields of data structures in a granular way without incurring per field overhead. During encoding of data currently stored in a subset of one or more of a plurality of fields of a data structure in a first message for a receiver, and the combination of the subset of fields has not been sent to the receiver, a metadata description for the combination is generated which defines for the receiver how to decode the data currently stored in the combination of the subset of fields. The metadata description does not include information on those one or more fields of the data structure that are not part of the subset of fields, and does not include the data currently stored in the subset of fields. A metadata description identification is generated for the metadata description which identifies the combination of the subset of fields represented by the metadata description. The encoded message is transmitted to the receiver including the metadata description, the metadata description identification, and the data currently stored in the subset of fields. During encoding of data of the same subset of fields of the data structure for a second message which includes the same combination of fields as the first message, the second message is transmitted to the receiver including the metadata description identification and the data currently stored in the subset of fields without transmitting the metadata description, whereby the encoded second message is encoded without per field overhead.

A receiver in a distributed system with a constrained set of resources decodes messages received and progressively builds a metadata description data structure. The receiver receives a first encoded message from a sender where the message includes a subset of one or more of a plurality of fields of a data structure. The message is determined to include a metadata description that defines how to decode the data currently included in the subset of fields of the message, and does not include the data currently stored in those fields. The message also includes a metadata description identification for the metadata description. The metadata description is stored according to the metadata description identification in a metadata description data structure, whereby the metadata description data structure is progressively populated with metadata for data structures as messages are received that include metadata descriptions. The first message is decoded according to the metadata description. The receiver receives a second encoded message from the sender which includes the same combination of fields of the data structure as the first message and includes the same metadata description identification as the first message. The second message is determined not to include a metadata description. The metadata description identification included in the second message is used to access the metadata description stored in the metadata description data structure for the combination of fields. The second message is decoded according to the metadata description accessed from the metadata description identification, whereby the second message is decoded without the message including a metadata description.

An apparatus for exchanging data in a distributed system with constrained resources without symmetric metadata knowledge between senders and receivers includes at least one sender and one receiver. The sender includes an encoding module, which when encoding messages for a receiver, is operative to perform the following: generate metadata descriptions for unique combinations of subset of fields of data structures, where each metadata description defines for the receiver how to decode data in the corresponding subset of fields of that data structure included in messages and does not include the data currently in those corresponding subset of field; generate a unique metadata description identification for each different metadata description; include metadata descriptions in the messages as well as the corresponding metadata description identifications to the receiver that has not previously received those metadata descriptions, whereby the messages are encoded without per field overhead. The receiver includes a decoding module, which when decoding messages received from the sender, is operative to: store metadata descriptions in a metadata description data structure as they are received from the sender, where each metadata description is associated with a metadata description identification, whereby the metadata description data structure is progressively populated with metadata for data structures as messages are received from the sender that include metadata descriptions; and decode those messages received from the sender that do not include metadata descriptions based on the stored metadata descriptions that correspond with the metadata description identifications included in these messages, whereby these messages are decoded without those messages including metadata descriptions.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computing device, an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.).

A method and apparatus for a high performance data exchange mechanism performed at a subset data structure granularity without per field overhead is described. In one embodiment of the invention, the sender has access to the metadata for the data structures and transmits only the metadata as needed to the receiver depending on the combination of the fields of the data structure that are to be sent to the receiver. Thus the receiver only has access to the metadata that the sender exchanges and does not have access to the entire metadata.

During encoding of data for a combination of a subset of fields of a data structure which has not been sent to the receiver, the sender generates a metadata description for the combination of the subset of fields that defines for the receiver how to decode the data of the subset of fields and a metadata description identifier for that metadata description. The metadata description does not include information on the other fields of the data structure that are not part of the subset of fields, and does not include the data of the subset of fields. The encoded message is transmitted to the receiver including the metadata description, the metadata description identifier, and the data of the subset of fields. The receiver stores the metadata description for the metadata description identifier and decodes the message with that metadata description.

During encoding of data for that same combination of subset of fields of the data structure, the encoded message includes the metadata description identifier and the data of the subset of fields and does not include the metadata description.

Thus, after a metadata description has been sent to a receiver for a certain combination of subset of fields, and the receiver has stored that metadata description, subsequent messages do not include the metadata description for that combination of fields. The receiver uses the metadata description identifier to access the stored metadata description and decodes that message with that metadata description.

Figure 1:
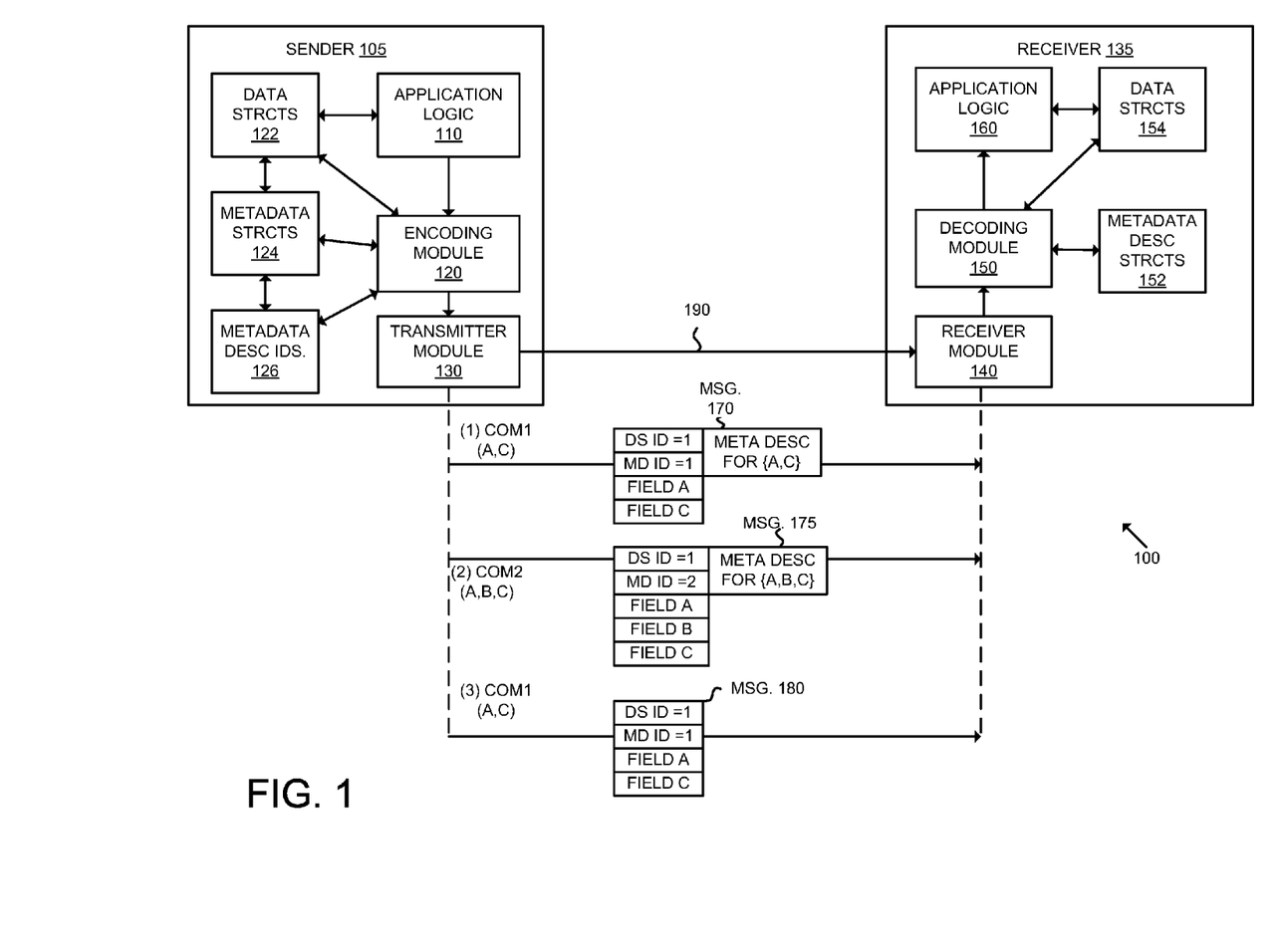
FIG. 1 illustrates an exemplary high performance data exchange mechanism performed at a subset data structure granularity without per field overhead in a distributed system according to one embodiment of the invention.

FIG. 1 illustrates an exemplary high performance data exchange mechanism performed at a subset data structure granularity without per field overhead in a distributed system according to one embodiment of the invention. The distributed system 100 includes the sender 105 exchanging data with the receiver 135. While the distributed system 100 includes a single sender and receiver, it should be understood that distributed systems with multiple senders and/or multiple receivers can use embodiments of the invention described herein.

The distributed system 100 can be any number of distributed systems. In some embodiments, the distributed system 100 is a distributed control plane on a network element, where the sender 105 is a process or module on a first control card of the distributed control plane and the receiver is a process or module on a second control card of the distributed control plane. In other embodiments, the distributed system 100 is a control plane to data plane interaction on a network element where the sender is a process or module on a control card and the receiver is a process or module on a line card. In some embodiments the distributed system 100 is in an embedded system and at least the receiver 135 is a constrained resource that is limited in terms of code size, memory size, and/or processing power. It should be understood that the distributed system 100 is not limited to network elements and embodiments of the invention described herein are applicable to other computing environments.

The sender 105 includes the application logic 110, the encoding module 120, and the transmitter module 130. The sender 105 also includes the data structures 122, the metadata structures 124, and the metadata description identifiers 126. The application logic 110 interacts with the encoding module 120 to trigger the start of the data exchange mechanism. In one embodiment, the application logic 110 uses an API that includes a start function to indicate that data of a data structure needs to be exchanged, an add function to add one or more fields of that data structure, and an end function to indicate that there is no more information from the data structure to be added. The data structures and their data are stored in the data structures 122. It should be understood that the data may be stored in multiple structures and/or in multiple formats. In some embodiments, the application logic 110 is a library that is called by a transmit function of a processor, a protocol application, or other process in a distributed system.

The encoding module 120 generates metadata descriptions for unique combinations of subset of fields of data structures that define for the receiver 135 how to decode the data in the corresponding subset of fields included in messages to the receiver 135. It should be understood that the term "combination" as used herein may also refer to permutations of the one or more fields of the data structure. The metadata descriptions for the combinations are generated from the metadata for the data structures stored in the metadata structures 124. By way of example, for each data structure, the following information is stored in the metadata structures 124: the type of each field (e.g., integer, character, Boolean, floating point, etc.) and the length of each field. The metadata structures may also include the byte order of an integer field (little or big endian), and/or other application specific information. Each unique data structure is identified by a data structure identifier. The metadata descriptions include the metadata information for the combination of subset of fields of the data structure that is being sent to the receiver 135. For example, for each field in the combination, the metadata description includes the length of each field, and the offset of each field in the data structure. In some embodiments, the metadata description also includes, for each field in the combination, the type of that field (e.g., integer, character, Boolean, floating point, etc.) and/or a field identifier which uniquely identifies that field of the data structure.

In some embodiments of the invention, the sender 105 has access to the metadata information for the data structures 122 (stored in the metadata structures 124) and the receiver 135 initially does not store or have direct access to any metadata for the data structures 154. Instead, the receiver 135 progressively builds its metadata information as it receives metadata descriptions from the sender 105. For purposes of explanation, the data structures 122 and the data structures 154 are equivalent, however in some embodiments the data structures 154 of the receiver 135 include different data structures than in the data structures 122 (e.g., data structures specific to different senders), and the data structures 122 may include different data structures than in the data structures 154 (e.g., data structures specific to different receivers).

In addition to generating metadata descriptions, the encoding module 120 generates a metadata description identification for each metadata description. The metadata description identification inherently identifies the combination of the subset of fields represented by the metadata description. In one embodiment, the metadata description identification is a metadata description identifier (e.g., an integer) and is generated once per unique metadata description, and is unique within a data structure. In one embodiment, the metadata description identification per data structure is sequentially updated as metadata descriptions are generated for that data structure. Metadata description identifiers are stored in the metadata description identifiers 126 according to their data structure identifier. In another embodiment where the fields are in order (e.g., as defined in the data structure), the metadata description identification is a field bitmap that describes which fields are contained in the message.

The transmitter module 130 encapsulates the stream of bytes and sends the encoded messages to the receiving module 140 of the receiver 135 over the communication link 190. The communication link 190 may be different in different embodiments depending on the type of distributed system 100 (e.g., a connection between a control card and line card, a connection between control cards, a logical connection between processes on a control card, etc.).

The sender 105 typically transmits metadata descriptions to the receiver 135 only if the receiver 135 does not already have access to that metadata description. For example, a metadata description is generated the first time a given combination of one or more fields of a data structure is to be sent to the receiver 135 and is subsequently sent to the receiver 135 along with the message (and the metadata description identification). The receiver 135 stores the metadata description according to the metadata description identification. For subsequent messages with that combination of one or more fields of that data structure, the sender 105 does not transmit the metadata description but rather transmits the metadata description identification to the receiver 135 to enable the receiver 135 to access the stored metadata description for that combination of fields of the data structure.

Thus, for each message that will include a combination of one or more fields of a data structure which has not been sent to the receiver 135, or the receiver 135 does not have access to the relevant metadata for that combination, the sender 105 encodes the messages with the data structure identifier, the metadata description identification, the metadata description, and the data for the fields. For each message that will include a combination of one or more fields of a data structure which has previously been sent to the receiver 135, the sender 105 encodes that message with the data structure identifier, the metadata description identification and the data for the fields (the message does not include the metadata description). As will be described in greater detail later herein, each message may also include a metadata description flag that indicates whether that message includes a metadata description.

The receiver 135 includes the receiving module 140, the decoding module 150, and the application logic 160. The receiver 135 also includes the metadata description structures 152 and the data structures 154. The receiving module 140 receives and decapsulates the stream of bytes received from the transmitter module 130, and passes the result to the decoding module 150 for decoding.

The decoding module 150 decodes the messages based on the information included in the messages. For each message that includes a metadata description, the decoding module 150 stores that metadata description according to its metadata description identification in the metadata description structures 152, and decodes that message according to that metadata description. The metadata description structures 152 may be implemented using one or more structures and include the metadata information from the metadata descriptions received from the sender 105.

The decoding module 150 recreates the complete data structure with the correct fields set which is then passed to the application logic 160 for further processing. By storing the metadata descriptions as they are received, the decoding module 150 progressively builds its metadata information and stores only metadata as it is needed. Thus the application logic 160 receives a complete data structure and is unaware that a subset of the fields of the data structure were transmitted across the communication link 190.

For each message that does not include a metadata description but does include a metadata description identification, the decoding module 150 uses that metadata description identification to lookup the corresponding metadata description in the metadata description structures 152. The decoding module 150 decodes the message and recreates the complete data structure with the correct fields set which are then passed to the application logic 160.

By way of example and with reference to FIG. 1, the sender 105 is transmitting a series of messages to the receiver 135 to exchange data for a particular data structure (with a data structure identifier of one). For purposes of explanation, the data structure includes the fields A, B, C, and D. In addition, prior to operation 1, the sender 105 has not transmitted data or metadata for that data structure to the receiver 135, and the receiver 135 does not have access to the metadata to decode fields of the data structure.

At operation 1, the sender 105 transmits a message to the receiver 135 for the combination of the fields A and C of the data structure. The application logic 110 interacts with the encoding module 120 to provide the data structure identifier (one), and the fields to be added (A and C) to the encoding module 120. The encoding module 120 determines that the combination of A and C has not previously been sent to the receiver 135.

Figure 2:
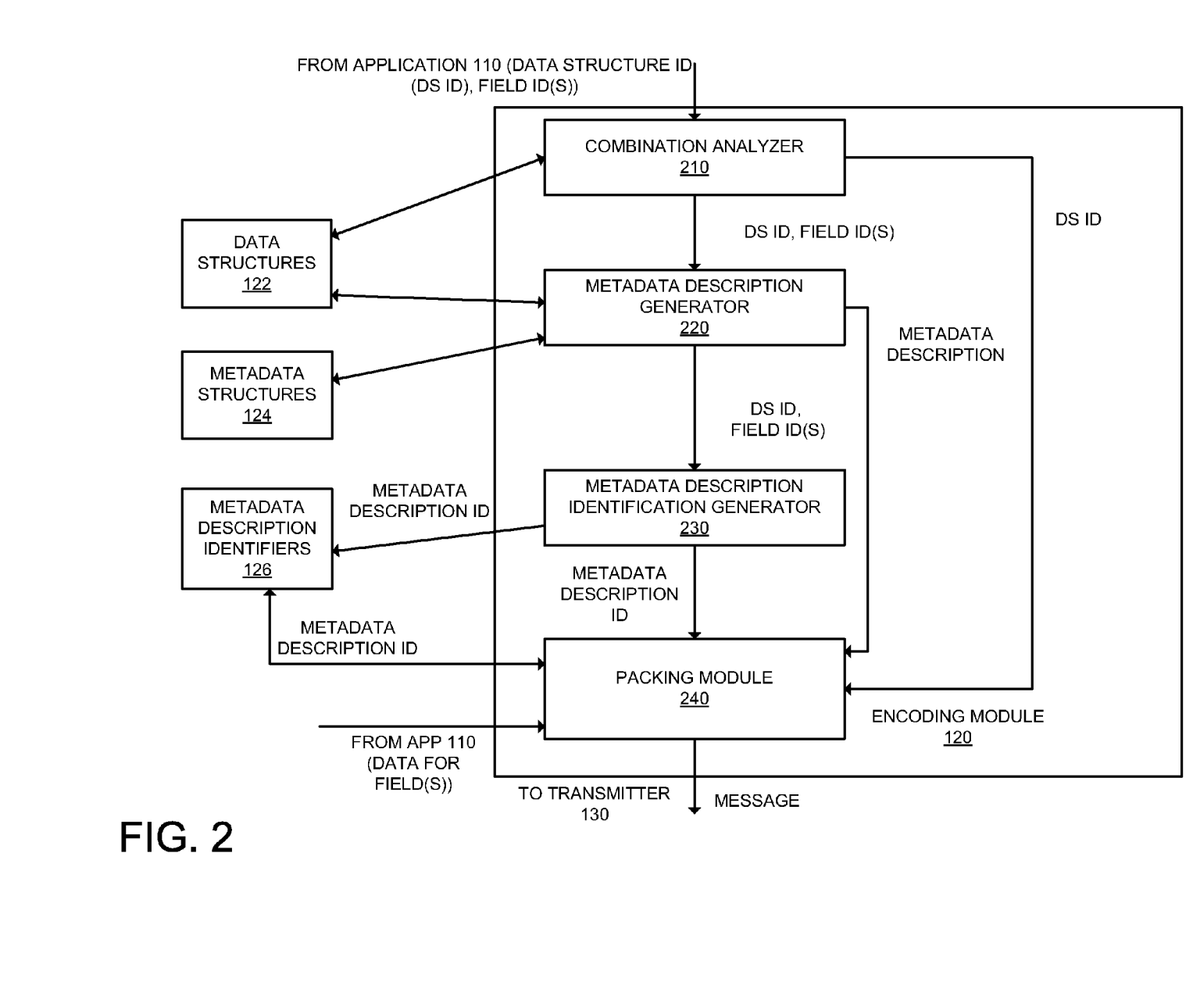
FIG. 2 illustrates an exemplary encoding module in the exemplary system of FIG. 1 according to one embodiment of the invention.

With reference to FIG. 2, which illustrates an exemplary encoding module 120 according to one embodiment of the invention, the combination analyzer 210 receives the data structure identifier (one) and the field identifiers of the fields (A and C) from the application logic 120. Based on this information and the data structures 122, the combination analyzer 210 determines whether the combination of the fields A and C of the data structure has previously been sent to the receiver 135. In one embodiment, each data structure in the data structures 122 is represented as a tree structure where each node of the tree has N children, where N is the number of fields in the data structure. As the application logic 110 adds more fields into the message to send, the combination analyzer 210 traverses the tree and eventually will reach a leaf of the tree. Using state in the leaf, the combination analyzer 210 can determine whether the combination has been previously sent to the receiver 135. In another embodiment, a hash table can be used to store combinations of fields. The hash table can be accessed to determine whether the combinations have previously been sent to the receiver 135.

With respect to FIG. 1, the combination analyzer 210 determines that the combination of the fields (A and C) of the data structure has not been sent to the receiver 135, and thus a metadata description for that combination has not been transmitted to the receiver 135. Therefore, the metadata description generator 220 is called to generate a metadata description for the combination of the fields (A and C) which define for the receiver 135 how to decode the data currently stored in that combination of fields. For example, the metadata description includes the length of each field and the offset of each field in the data structure. The metadata description may also include the number of fields in the combination (in this case two), the type of each field (e.g., integer, character, Boolean, floating point, etc.), a field identifier of each field. In some embodiments, the generated metadata description is stored in a metadata description structure accessible by the sender 105.

For each metadata description, a metadata description identification also is generated. Therefore, the metadata description identification generator 230 is called to generate a metadata description identification for the generated metadata description. As described above, in some embodiments the metadata description identification is an identifier which is generated once per unique metadata description and is stored in the metadata description identifiers structure 126, while in other embodiments where the fields are in order (e.g., as defined in the data structure), the metadata description identification is a field bitmap that describes which fields are contained in the message and is generated for each message. With reference to FIG. 1, a metadata description identifier of one has been generated for the combination of the fields A and C.

The metadata description, metadata description identification, data structure identifier, and the data for the fields, are used by the packing module 240 to encode the message to pass to the transmitter 130 to send over the communication link 190 to the receiver 135. The transmitter 130 forms and transmits the message 170 to the receiver 135 over the communication link 190.

Figure 3:
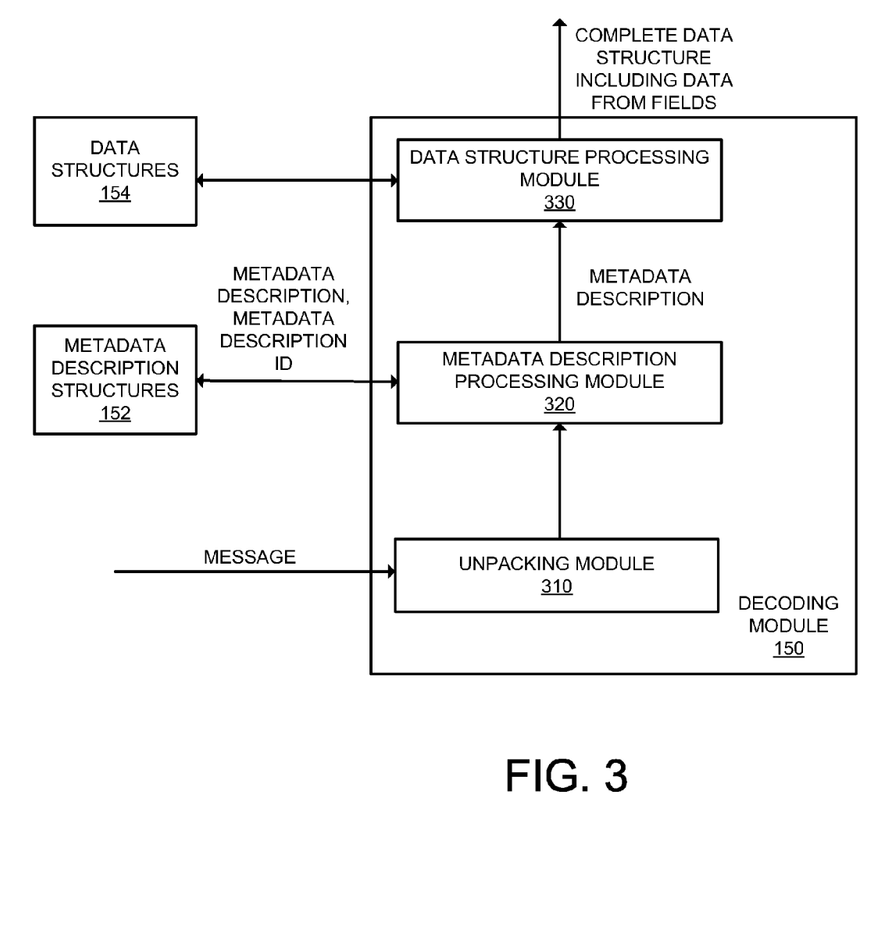
FIG. 3 illustrates an exemplary decoding module in the exemplary system of FIG. 1 according to one embodiment of the invention.

The receiving module 140 receives and decapsulates the message 170 and passes the result to the decoding module 150. With reference to FIG. 3, which illustrates an exemplary decoding module 150 according to one embodiment, the unpacking module 310 receives the message, performs initial parsing of the message, and passes the message to the metadata description processing module 320.

The metadata description processing module 320 determines that the message 170 includes a metadata description. In one embodiment, the metadata description processing module 320 determines that a metadata description flag is set in the message 170, which indicates that the message includes a metadata description. Since the message 170 includes a metadata description, the metadata description processing module 320 stores the metadata description according to the metadata description identification included in the message 170 in the metadata description structures 152.

The data structure processing module 330 is then called which uses the metadata description to decode the message 170 and recreate the complete data structure (based on the information from the data structures 154) with the correct fields set. The result is passed to the application logic 160. In one embodiment, for each data structure identifier and metadata description identification, the metadata description processing module 320 builds a linked list that includes an element for each field, and contains the offset from the start of the structure and the next pointer. The data structure processing module 330 uses the data structure identifier and the metadata description identification to de-multiplex into the correct linked list. The data structure processing module 330 then traverses the list and copies the fields into a buffer for the application logic 160 to provide a complete data structure for the application logic 160. Since the application logic 160 is provided a complete data structure, the application logic 160 does not need to be changed or aware that only a subset of fields, and not the complete data structure, was transmitted over the communication link 190.

Referring back to FIG. 1, at operation 2, the sender 105 transmits the message 175 to the receiver 135 for the combination of the fields A, B, and C of the data structure. A metadata description is generated for the combination of the fields A, B, and C since that combination has not previously been sent to the receiver 135. In one embodiment, the metadata description includes the lengths of the fields and the offset of the fields, and optionally the number of fields (in this case three), the types of the fields, and field identifiers for the fields. As illustrated in FIG. 1, a metadata description identifier of two is associated with the metadata description for the combination of the fields A, B, and C. The message 175 is transmitted over the communication link 190 and decoded by the receiver 135 in a similar way as the message 170.

At operation 3, the sender 105 transmits the message 180 to the receiver 135 for the combination of the fields A and C of the data structure. Thus, the message 180 includes the same combination of fields of the data structure as the message 170. With reference to FIG. 2, the combination analyzer 210 determines that the combination of the fields A and C has previously been sent to the receiver 135. Since the combination has been previously sent, the encoding module 120 assumes that the receiver 135 has access to the metadata description for that combination. Thus, the message 180 includes the data structure identifier, the data for the field A, B, C, and the metadata description identification but does not include the metadata description.

The receiving module 140 receives and decapsulates the message 180 and passes the result to the decoding module 150. With reference to FIG. 3, the metadata description processing module 320 determines that the message 180 does not include a metadata description (e.g., the metadata description flag is not set). Since the message does not include a metadata description, the metadata processing module 320 uses the metadata description identification included in the message to lookup the stored metadata description in the metadata description structures 152, which is then used to decode the message 180 in a similar way as described previously with reference to the message 170.

Thus, as illustrated in FIG. 1, after the sender 105 sends a metadata description for a particular combination of one or more fields of a data structure, subsequent messages for that combination do not include a metadata description. Accordingly, the size of the subsequent messages is decreased and they can be transmitted more efficiently (e.g., the messages are in a compact form and thus take less space in buffers, during transit, etc.).

In addition, unlike prior art data exchange implementations, the receiver 135 progressively builds its metadata structures as it receives metadata descriptions from the sender 105. Thus the metadata information between the sender 105 and the receiver 135 is asymmetric because the sender 105 has access to all the metadata for each of the data structures that are to be exchanged and the receiver 135 typically has only the metadata which the sender 105 transmits. While this has general applicability, it is especially useful in distributed systems in embedded environments where the receiver is resource constrained (e.g., has a relatively small amount of memory, processing power, etc.).

Additionally, components in a distributed system, particularly those which regularly send state updates, regularly transmit data for the same combinations of fields of a data structure. Using embodiments of the invention described herein, the overhead for transmitting these subsequent messages can be limited to transmitting a data structure identifier and a metadata description identification (assuming that the metadata description and its corresponding metadata description identification has been previously sent). Thus unlike prior art data exchange implementations that require per field overhead, embodiments of the invention reduce the overhead to a per message overhead rather than a per field overhead.

Figure 4:
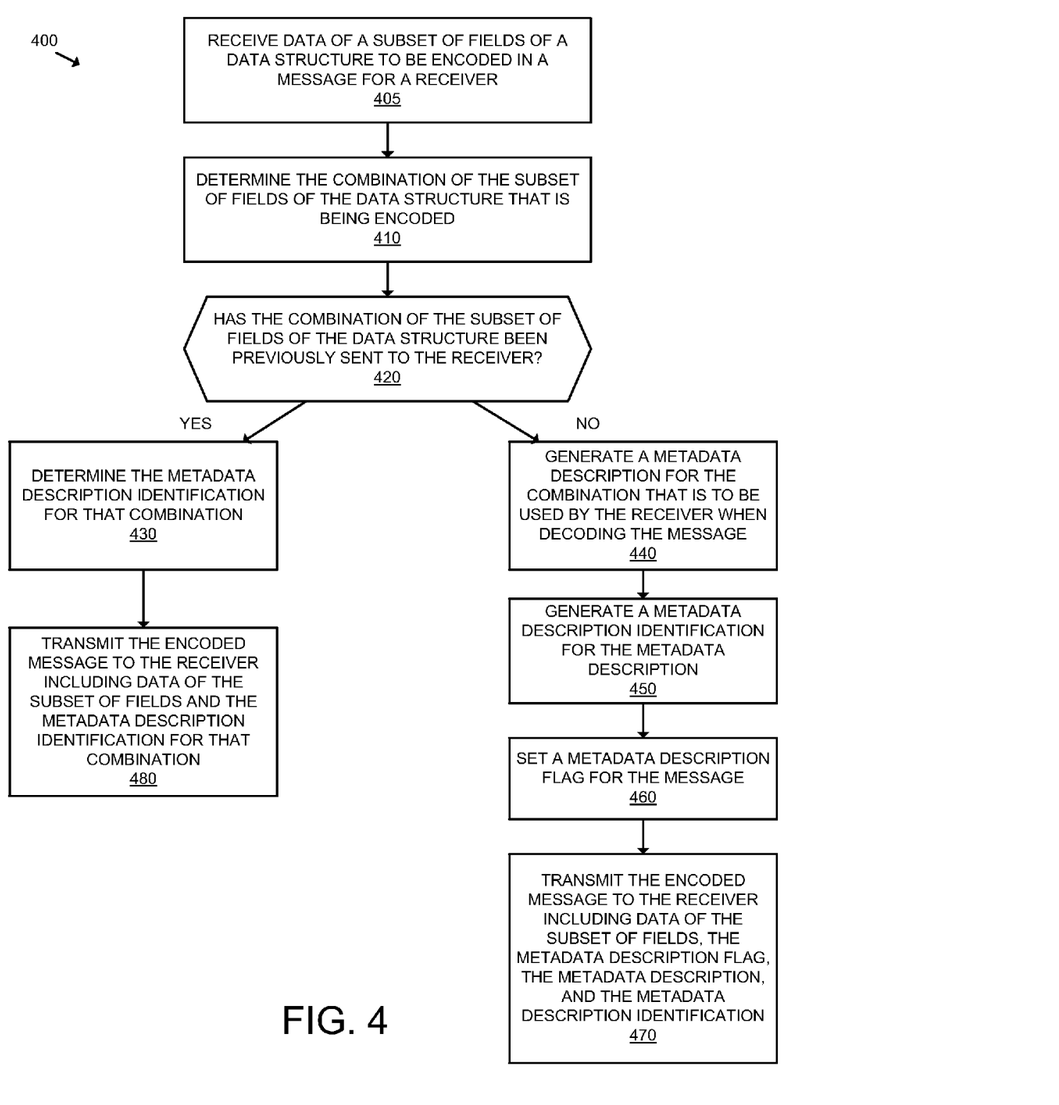
FIG. 4 is a flow diagram illustrating exemplary operations for encoding messages at a subset data structure granularity without per field overhead for use in distributed system according to one embodiment of the invention.

FIG. 4 is a flow diagram illustrating exemplary operations for encoding messages at a subset data structure granularity without per field overhead for use in distributed system according to one embodiment of the invention. The operations of FIG. 4 will be described with reference to the exemplary embodiment of FIG. 1. However, it should be understood that the operations of FIG. 4 can be performed by embodiments of the invention other than those discussed with reference to FIG. 1, and the embodiments discussed with reference to FIG. 1 can perform operations different than those discussed with reference to FIG. 4.

The operations 400 begin at block 405, where the encoding module 120 receives data of a subset of fields of a data structure to be encoded in a message for a receiver. In some embodiments, this is a result of an application or other function calling a transmit function with the subset of fields of the data structure. Flow moves from block 405 to block 410.

At block 410, the encoding module 120 determines the combination of the subset of fields of the data structure that is being encoded. Flow moves to block 420, where the encoding module 120 determines whether that combination of fields of the data structure has previously been sent to the receiver. If the combination of fields has been sent, then flow moves to block 430, otherwise flow moves to block 440.

At block 440 (the combination of fields has not previously been sent), the encoding module 440 generates a metadata description for the combination that is to be used by the receiver when decoding the message. The metadata description is generated from the information in the metadata structures 124 for the data structure. As previously described, the generated metadata description does not include information on those fields which are not part of the subset of fields and does not include the data currently stored in the subset of fields. The metadata description defines for the receiver how to decode the data in the message (e.g., length of each field, the offset of each field in the data structure). The metadata description may also include the number of fields in the message, the type of each field (e.g., integer, character, Boolean, floating point, etc.), and a field identifier for each field. Flow moves from block 440 to block 450.

At block 450, the encoding module 120 generates a metadata description identification for the generated metadata description which uniquely identifies that metadata description for that data structure. In some embodiments the metadata description identification is an identifier (e.g., an integer value) while in other embodiments where the fields are in order (e.g., as defined by the data structure), the metadata description identification is a field bitmap which indicates which indicates which fields are in the message. If the metadata description identification is an identifier, the identifier is stored in the metadata description identifiers 126. Flow moves from block 450 to block 460.

At block 460, the encoding module 120 sets a metadata description flag to be included in the message. The metadata description flag notifies the receiver that the message includes a metadata description. Flow moves from block 460 to block 470, where the encoded message is transmitted to the receiver. The encoded message includes the data of the subset of fields, the metadata description flag, the metadata description, and the metadata description identification.

With reference to block 430 (the combination has previously been sent to the receiver), the encoding module 120 determines and retrieves the metadata description identification that was assigned to that combination (e.g., from the metadata description identifiers structure 126). Flow then moves to block 480, where the encoded message is transmitted to the receiver. The encoded message includes the data of the subset of fields, and the metadata description identification for the combination. The encoded message does not include the metadata description.

Figure 5:
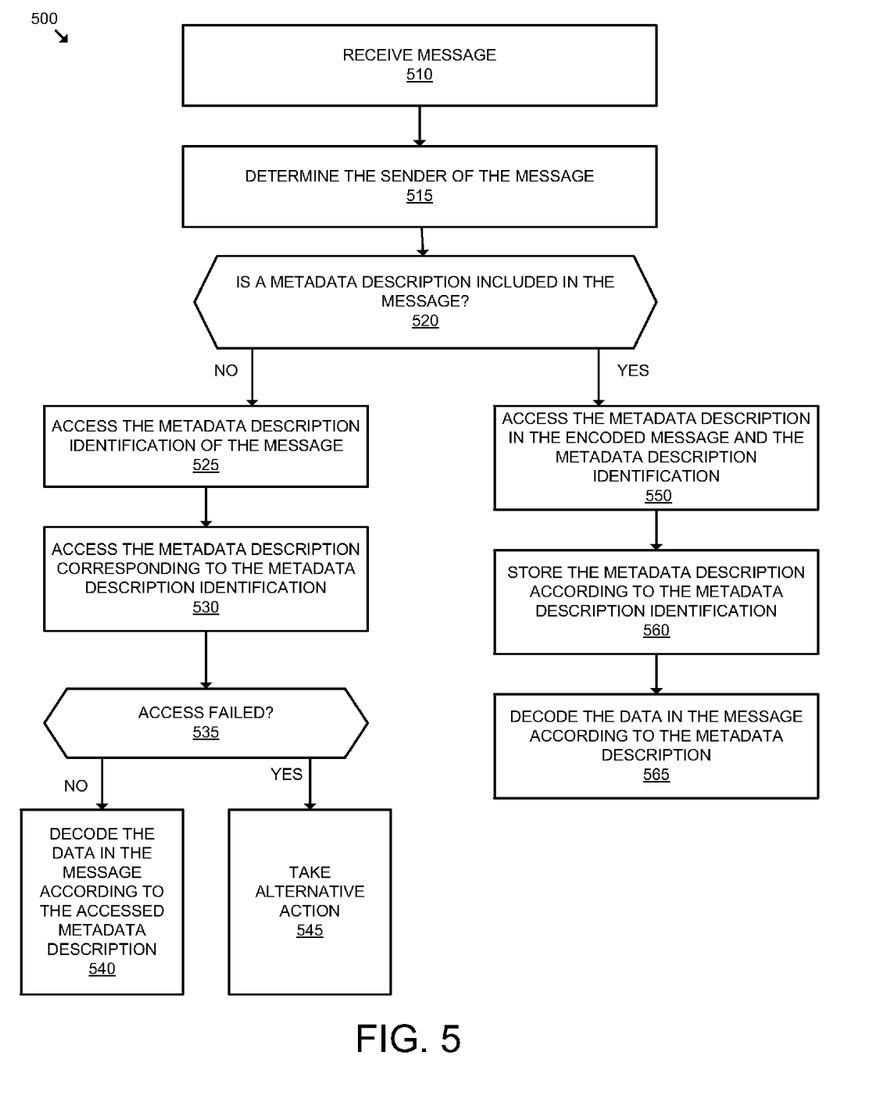
FIG. 5 is a flow diagram illustrating exemplary operations for decoding messages sent at a subset data structure granularity without per field overhead according to one embodiment of the invention.

FIG. 5 is a flow diagram illustrating exemplary operations for decoding messages sent at a subset data structure granularity without per field overhead according to one embodiment of the invention. The operations of FIG. 5 will be described with reference to the exemplary embodiment of FIG. 1. However, it should be understood that the operations of FIG. 5 can be performed by embodiments of the invention other than those discussed with reference to FIG. 1, and the embodiments discussed with reference to FIG. 1 can perform operations different than those discussed with reference to FIG. 5.

The operations 500 begin at block 510, where the decoding module 150 receives a message (e.g., passed from the receiving module 140). Flow then moves to block 515 where the decoding module 150 determines the sender of the message. For purposes of explanation, the sender 105 transmitted the message. Flow then moves to block 520 where the decoding module 150 determines whether a metadata description is included in the message. In one embodiment, the decoding module 150 parses the message to determine whether it includes a set metadata description flag. If the message does not include a metadata description, then flow moves to block 525, otherwise flow moves to block 550.

At block 550 (there is a metadata description included in the message), the decoding module 150 accesses the metadata description and the metadata description identification in the message. Flow moves from block 550 to block 560, where the decoding module 150 stores the metadata description according to the metadata description identification in the metadata description structures 152. The metadata description structures 152 may be designed differently in different embodiments of the invention (e.g., one or more tree structures, one or more tables, one or more linked lists, or other data structures as known in the art).

Flow moves from block 560 to block 565, where the decoding module 150 decodes the data in the message according to the metadata description. As previously described, the decoding module 150 recreates the complete data structure including those fields not represented in the message with the correct fields set for the application logic 160.

With reference to block 525 (the message does not include a metadata description), the decoding module accesses the metadata description identification in the message. Flow then moves to block 530, where the decoding module 150 accesses the metadata description associated with that metadata description identification in the metadata description structures 152. Flow then moves to the block 535. If the access fails (the metadata description does not exist), then flow moves to block 545 where alternative action is taken (e.g., the receiver 135 notifies the sender 105 that it does not have the metadata description), otherwise flow moves to block 540. At block 540, the decoding module 150 decodes the data in the message according to the accessed metadata description. As previously described, the decoding module 150 recreates the complete data structure including those fields not represented in the message with the correct fields set for the application logic 160.

Figure 6:
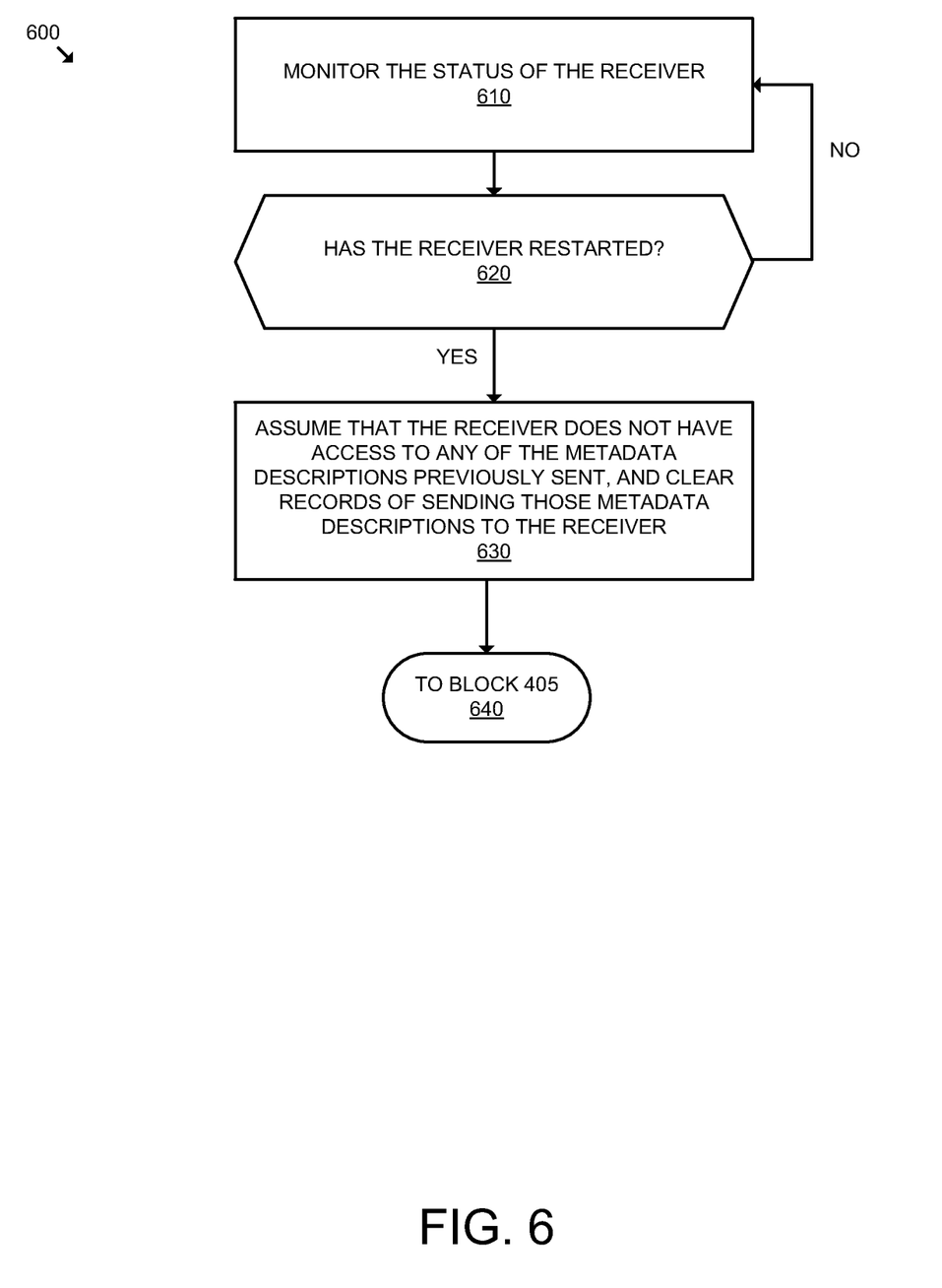
FIG. 6 is a flow diagram illustrating exemplary operations for handling a restart of the receiver according to one embodiment of the invention.

In some embodiments the sender 105 monitors the state of the receiver 135 to determine if the receiver 135 restarts or otherwise will lose the metadata descriptions it has received and stored. FIG. 6 is a flow diagram illustrating exemplary for handling a restart of the receiver according to one embodiment of the invention. The operations of FIG. 6 will be described with reference to the exemplary embodiment of FIG. 1. However, it should be understood that the operations of FIG. 65 can be performed by embodiments of the invention other than those discussed with reference to FIG. 1, and the embodiments discussed with reference to FIG. 1 can perform operations different than those discussed with reference to FIG. 6.

The operations 600 begin at block 610, where the sender 105 monitors the status of the receiver 135. Flow moves from block 610 to block 620. If the sender 105 determines that the receiver 135 has restarted, or otherwise has received an indication that the receiver 135 has restarted, then flow moves to block 630 where the sender 105 assumes that the receiver 135 does not have access to any of the metadata descriptions it has previously sent, and it clears any record of sending those metadata descriptions to the receiver 135. Thus the sender 105 will treat each combination of message that is sent to the receiver 135 as being sent for the first time and will accordingly generate and/or include the metadata descriptions in the initial messages as described with reference to FIG. 4.

While embodiments of the invention have been described in relation to a single message being transmitted over the communication link 190 at a given time, in other embodiments of the invention the sender 105 groups messages that contain the same combination of fields for the same data structure in a single message. In this embodiment, the sender 105 adds a field that includes the number of messages that follow for that combination.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device for a sender of a distributed system to encode and transmit messages containing subsets of fields of data structures in a granular way without incurring per field overhead, the method comprising the steps of:
during encoding of data currently stored in each field of a subset of one or more but less than all of a plurality of fields of a data structure in a first message for a receiver, performing the following steps:
determining that the combination of the subset of fields has not been sent to the receiver;
generating a metadata description for the combination of the subset of fields that defines for the receiver how to decode the data currently stored in the combination of the subset of fields, wherein the metadata description does not include information on those one or more fields of the data structure that are not part of the subset of fields, wherein the metadata description does not include the data currently stored in the subset of fields;
generating a metadata description identification for the metadata description that identifies only the combination of the subset of fields represented by the metadata description, wherein the metadata description identification is unique per unique metadata description;
transmitting the encoded first message to the receiver including the metadata description, the metadata description identification, and data currently stored in the subset of fields;
during encoding of data of the same subset of fields of the data structure in a second message, wherein the second message includes the same combination of the subset of fields as the first message, performing the following step:
determining that the combination of the subset of fields has previously been sent to the receiver indicating that the metadata description identification for the metadata description is the same as that generated for the first message, and
transmitting the encoded second message to the receiver including only one instance of the metadata description identification and including the data currently stored in the subset of fields without transmitting the metadata description, whereby the encoded second message is encoded without per field overhead.

2. The method of claim 1, wherein the distributed system is a distributed control plane on a network element, wherein the sender is a process on a first control card of the distributed control plane and the receiver is a process on a second control card of the distributed control plane.

3. The method of claim 1, wherein the generated metadata description identification is assigned to the metadata description, and wherein the metadata description identifier is generated once per unique metadata description.

4. The method of claim 1, wherein the generated metadata description identification is a field bitmap.

5. The method of claim 1, wherein the information included in the metadata description includes the length of each field and the offset of each field in the data structure.

6. The method of claim 5, further comprising the steps of:
generating a field identifier for each field of the subset of fields;
including the field identifiers in the metadata description;
setting a metadata description flag in the first message to notify the receiver that the encoded first message includes a metadata description.

7. The method of claim 6, further comprising the steps of:
monitoring the status of the receiver;
determining that the receiver has restarted;
during encoding of data currently stored in the subset of fields of the data structure in a third message for the receiver, performing the following step:
retrieving the metadata description for the combination of the subset of fields and the corresponding metadata description identification; and
transmitting the metadata description for the combination of the subset of fields, the metadata description identification for that metadata description, and the data currently stored in the subset of fields to the receiver.

8. The method of claim 1, wherein one or more messages are encoded after the first message and before the second message.

9. A method in computing device for a receiver to decode messages received in a distributed system with constrained set of resources and progressively build a metadata description data structure, the method comprising the steps of:
receiving a first encoded message from a sender, wherein the first encoded message includes data for each field of a subset of one or more but less than all of a plurality of fields of a data structure;
determining that the first encoded message includes a metadata description that defines how to decode the data currently included in each of the subset of fields of the first encoded message, wherein the first encoded message also includes a metadata description identification for the metadata description that identifies only the subset of fields represented by the metadata description, and wherein the metadata description does not include the data currently stored in the subset of fields;
storing the metadata description according to the metadata description identification in a metadata description data structure, whereby the metadata description data structure is progressively populated with metadata for data structures as messages are received that include metadata descriptions;
decoding the first encoded message according to the metadata description;
receiving a second encoded message from the sender, wherein the second encoded messages includes the same combination of fields of the data structure as the first encoded message and includes the same metadata description identification as the first encoded message;
determining that the second encoded message does not include a metadata description;
accessing, from among multiple metadata descriptions stored in the metadata description data structure, the metadata description stored responsive to the first encoded message, wherein the accessing is performed with the metadata description identification included in the second encoded message; and
decoding the second encoded message according to the stored metadata description, whereby the second encoded message is decoded without the second encoded message including a metadata description.

10. The method of claim 9, wherein the distributed system is a distributed control plane on a network element, wherein the sender is a process on a first control card of the distributed control plane and the receiver is a process on a second control card of the distributed control plane.

11. The method of claim 10, wherein the step of determining that the first encoded message includes a metadata description further includes the step of accessing a metadata description flag in the first encoded message and determining that the flag has been set.

12. The method of claim 9, wherein the metadata description includes for each field in the first encoded message a length of that field and an offset value of that field in the data structure.

13. The method of claim 12, wherein the first and second encoded messages include a same data structure identifier that identifies the data structure, and wherein the first and second encoded messages include a field identifier for each of the subset of fields.

14. The method of claim 13, further comprising the steps of:
building a linked list that includes an element for each field represented by the metadata description, wherein each element includes an offset from the start of that field and a pointer to a next field of the data structure.

15. The method of claim 13, further comprising the steps of:
recreating the data structure including all of the fields of the data structure including those not part of the subset of fields in the first encoded message, wherein the appropriate fields of the data structure are populated with data decoded from the first encoded message.

16. An apparatus for exchanging data in a distributed system with constrained resources without symmetric metadata knowledge between senders and receivers, the apparatus comprising:
a network element including the following:
a sender including an encoding module, which when encoding messages for a receiver, is operative to:
generate metadata descriptions for unique combinations of subset of fields of data structures, wherein each subset of fields of each of the data structures includes one or more but less than all of a plurality of fields of that data structure, wherein each metadata description defines for the receiver how to decode data in the corresponding subset of fields of that data structure included in messages, and wherein the metadata description does not include the data currently in those corresponding subset of fields,
generate a unique metadata description identification for each different metadata description that identifies only the subset of fields represented by that metadata description,
include metadata descriptions and the corresponding metadata description identifications in messages to the receiver when the receiver has not previously received those metadata descriptions, and
include metadata description identifications without including metadata descriptions in messages to the receiver when the receiver has previously received those metadata descriptions, whereby these messages are encoded without per field overhead; and
the receiver including a decoding module, which when decoding messages received from the sender, is operative to:
store metadata descriptions in a metadata description data structure as they are received from the sender and in a manner that they may be looked up using corresponding metadata description identifications, wherein each metadata description is associated with a different metadata description identification, whereby the metadata description data structure is progressively populated with metadata for data structures as messages are received from the sender that include metadata descriptions, and
decode those messages received from the sender that do not include metadata descriptions based on selecting via a look up in the metadata description data structure those of the stored metadata descriptions that correspond with the metadata description identifications included in these messages.

17. The apparatus of claim 16, wherein the distributed system is a distributed control plane on the network element, wherein the sender is a process on a first control card of the distributed control plane and the receiver is a process on a second control card of the distributed control plane.

18. The apparatus of claim 16, wherein the generated identification is a metadata description identifier that is generated once per unique metadata description.

19. The apparatus of claim 16, wherein the generated identification is a field bitmap that is generated each time a message is encoded.

20. The apparatus of claim 16, wherein each metadata description includes for each field represented by that metadata description a length of that field and an offset value of that field of the corresponding data structure.

21. The apparatus of claim 16, further comprising:
the encoding module is further operative to:
include a field identifier for each field in the each message to be sent to the receiver regardless whether a metadata description is encoded in that message.

22. The apparatus of claim 16, wherein the encoding module is further operative to:
monitor the status of the receiver;
responsive to determining that the receiver has restarted, include metadata descriptions in the messages as well as the corresponding metadata description identifications regardless if the receiver has previously received those metadata descriptions.

23. The apparatus of claim 16, wherein the decoding module is further operative to recreate complete data structures including those fields not included in the messages, wherein appropriate fields of the data structures are to be populated with data decoded from the messages.

* * * * *